(12) United States Patent  
Smith

(10) Patent No.: US 7,166,833 B2
(45) Date of Patent: Jan. 23, 2007

(54) FIBER OPTIC REMOTE READING ENCODER

(75) Inventor: Ronald H. Smith, Rockville, MD (US)

(73) Assignee: Optelecom-NKF, Germantown, MD (US)

( * ) Notice: Subject to any disclaimer, the term of this patent is extended or adjusted under 35 U.S.C. 154(b) by 148 days.

(21) Appl. No.: 10/959,041

(22) Filed: Oct. 7, 2004

(65) Prior Publication Data

US 2005/0077456 A1 Apr. 14, 2005

Related U.S. Application Data

(60) Provisional application No. 60/509,982, filed on Oct. 10, 2003.

(51) Int. Cl.
*G01D 5/34* (2006.01)
*H03M 1/22* (2006.01)

(52) U.S. Cl. ............... 250/231.13; 250/231.14; 341/13; 341/14

(58) Field of Classification Search ......... 250/231.13, 250/231.14, 231.15, 231.16, 231.17, 231.18; 341/13, 14; 33/1 PT, 1 N; 356/616, 617
See application file for complete search history.

(56) References Cited

U.S. PATENT DOCUMENTS

| | | | |
|---|---|---|---|
| 3,982,106 A | 9/1976 | Stutz | |
| 4,602,242 A | 7/1986 | Kimura | |
| 4,633,224 A | 12/1986 | Gipp et al. | |
| 4,641,027 A | 2/1987 | Renner et al. | |
| 4,733,069 A | 3/1988 | Narutaki | |
| 5,068,529 A | 11/1991 | Ohno et al. | |
| 5,336,884 A | 8/1994 | Khoshnevisan et al. | |
| 5,422,479 A | 6/1995 | Sahori | |
| 5,451,776 A | 9/1995 | Kolloff et al. | |
| 5,665,974 A * | 9/1997 | Truong | 250/555 |
| 5,748,111 A * | 5/1998 | Bates | 341/11 |
| 5,825,023 A * | 10/1998 | Cai et al. | 250/559.29 |
| 5,965,879 A | 10/1999 | Leviton | |
| 6,512,589 B1 | 1/2003 | Rodi | |
| 6,545,262 B1 | 4/2003 | Burgschat | |
| 6,562,169 B1 | 5/2003 | Holzapfel et al. | |
| 6,666,375 B1 | 12/2003 | Harriman et al. | |
| 2003/0047674 A1 * | 3/2003 | Thornburn et al. | 250/231.13 |
| 2003/0062470 A1 | 4/2003 | Burgschat et al. | |

* cited by examiner

*Primary Examiner*—Georgia Epps
*Assistant Examiner*—Don Williams
(74) *Attorney, Agent, or Firm*—Hoffman, Wasson & Gitler, P.C.

(57) ABSTRACT

A system and method for determining the absolute position of a linear or rotary actuator. A code plate having a series of digital words thereon is associated with the linear or rotary actuator. Each of the digital words consists of a plurality of bits, each bit consisting of a series of parallel encoder elements, each in the shape of a wedge. One or two optical sensor heads would be used in conjunction with a signal processor to determine the exact position of the code plate, and, in turn, the linear or rotary actuator. The exact position of each of the sensor heads with respect to the code plate is determined based upon the value of optical signals reflected off of the wedge-shaped elements and detected by each of the optical sensors.

22 Claims, 9 Drawing Sheets

FIBER OPTIC REMOTE READING ENCODER

CROSS-REFERENCED APPLICATION

The present application claims the priority of provisional patent application Ser. No. 60/509,982 filed Oct. 10, 2003.

BACKGROUND OF THE INVENTION

1. Field of the Invention

The present invention relates to linear or rotary optical encoders used to measure the position of a linear or rotary moving element such as an actuator.

2. Description of the Prior Art

It is certainly true that optical encoders are well known in the prior art. A typical optical encoder would be utilized to measure the digital absolute position of a linear or rotary moving element. Generally, these prior art optical encoders would include a code plate having several tracks of alternating dark and transparent bands and an optical emitter and detector on either side of the code plate assigned to reading each band. Alternatively, the emitter and detector may be on the same side of the code plate with the alternating bands having high and low reflectivity. In either situation, an optical emitter/detector combination would be assigned to each of the bands, thereby increasing the complexity and the cost of the system. A typical optical reading encoder capable of resolving the absolute position of the code plate to one part in a thousand would require approximately 10 pairs of optical emitters and detectors to read the 10 tracks on the code plate.

Examples of prior art optical detectors are U.S. Pat. No. 4,602,242 issued to Kimura; U.S. Pat. No. 4,720,699 issued to Smith; U.S. Pat. No. 5,336,884 issued to Khoshnevisan et al.; U.S. Pat. No. 5,451,776 issued to Kolloff et al.; and U.S. Pat. No. 5,748,111 issued to Bates.

The patent to Smith describes an optical encoder employing a line array of detectors. A single strip of encoding bars is used in conjunction with a plurality of detectors 6 to determine the absolute position of the strip of encoding bars. As shown in FIG. 4, a multitude of detector element 6 must be utilized.

The patent to Kolloff et al. describes an optical encoder for sensing the linear position of an optical medium moving in a linear direction. As illustrated in FIGS. 1 and 2, the encoder includes a rectangular plate 102 provided with a linear absolute track 104 as well as additional linear tracks 110, 112, 114 and 116. Each track is associated with 1 of 5 optical fibers 188, 190, 192, 194 and 196 extending from a distant point with respect to the encoder assembly to connect with other elements. Each of the tracks contains a series of optically detectable marks spaced evenly around the rectangular plate under each of the tracks. Each of the marks is detected by interferometric reflection of coherent light.

The patent to Khoshnevisan et al. is generally related to an optic encoder for sensing an angular position. A circular disc is provided with an angular absolute track 104 as well as a number of additional angular tracks 110, 112, 114 and 116 as illustrated in FIG. 1. Each of the tracks is provided with a plurality of angularly-spaced "dark" or "bright" bits. A plurality of optical fibers 188–196 is used, one optical fiber associated with each of the tracks.

The patent to Kimura describes either a linear or rotary encoder containing a code carrying medium having a fine reading track 21 and a rough reading track 22 which is parallel with respect to one another. The fine reading track 21 is divided into a plurality of blocks 21a and the rough reading track 22 is divided into a plurality of blocks 23.

The patent to Bates describes an apparatus for monitoring the speed and actual position of a rotating member. This apparatus includes a grating portion 114 including a plurality of wedge-shaped pattern markings 22 that are equally spaced around a periphery surface 20. A sensor 16 in conjunction with a processor 18 would determine both the speed and actual position of the rotating member.

None of the above-noted prior art patents describes an optical encoder utilizing a code plate having a plurality of wedge-shaped items defining a plurality of digital words associated with a linear or rotary moving element. Additionally, none of these references would employ a relatively small number of detectors to quickly and efficiently detect the absolute position of the code plate which, in turn, is associated with the actual position of the linear or rotary moving element.

SUMMARY OF THE INVENTION

The deficiencies of the prior art are addressed by the present invention which describes an optical absolute position encoder including a code plate having a plurality of encoder elements forming, in turn, a plurality of digital words extending for at least a portion of the entire length of a linear position encoder or provided along the periphery of at least a portion of a rotary position encoder. Although the present invention can be applied to both a linear encoder as well as a rotary encoder, for ease of explanation, we will limit our discussion to a linear encoder. One or two optical emitter/detector combinations would be utilized to read the digital absolute position of the code plate. Each of the emitter/detector combinations would be provided on a single sensor head. When two pairs of emitter/detectors are employed, each would be provided on a separate read head separated from one another by a precise distance.

Each of the digital words would contain a Most Significant Bit (MSB) and a plurality of additional bits, thereby creating a multi-bit digital word. The code plate would contain a plurality of these digital words. Each of the digital bits of each of the words would represent either a digital "0" or digital "1" based upon whether the reflectivity of each of the encoder elements was decreasing or increasing in the direction of movement assigned a positive value on the code plate. Each of the bits would constitute a plurality of parallel encoder tracks. Within each bit of the digital word, based upon the exact reflectivity sensed by each optical detector or detectors, the analog, or exact position of the code plate would then be determined.

The present invention would employ a Gray code relationship whereby each digital word would only differ by the change of one bit from each adjacent digital word.

A signal processing device is used to operate the optical decoder according to the present invention. This signal processor would be provided with sufficient software and memory for properly controlling the operation of the present invention. The memory of the signal processor would be provided with the position of each of the digital words on the code plate as well as the orientation, which defines bit value of each of the encoder elements on the code plate. Therefore, utilizing the information gathered by the optical detector or detectors, the exact position of the code plate and its associated moving element would be determined. Once the signal processing device determines the exact position of the moving elements, it would be relayed to an appropriate output device.

The present invention is designed to operate in various electromagnetic and volatile environments. Therefore, to combat electrical magnetic interference, as well as to ensure that no sparks are generated, each of the optical detector/emitter combinations would be in communication with an optical waveguide, thereby allowing for a remote reading of the position of the code plate and its associated actuator.

DESCRIPTION OF THE DRAWINGS

The present invention will be better understood when consideration is given to the following detailed description thereof. This description makes reference to the following drawings wherein.

DETAILED DESCRIPTION OF THE PRESENT INVENTION

Figure 1:
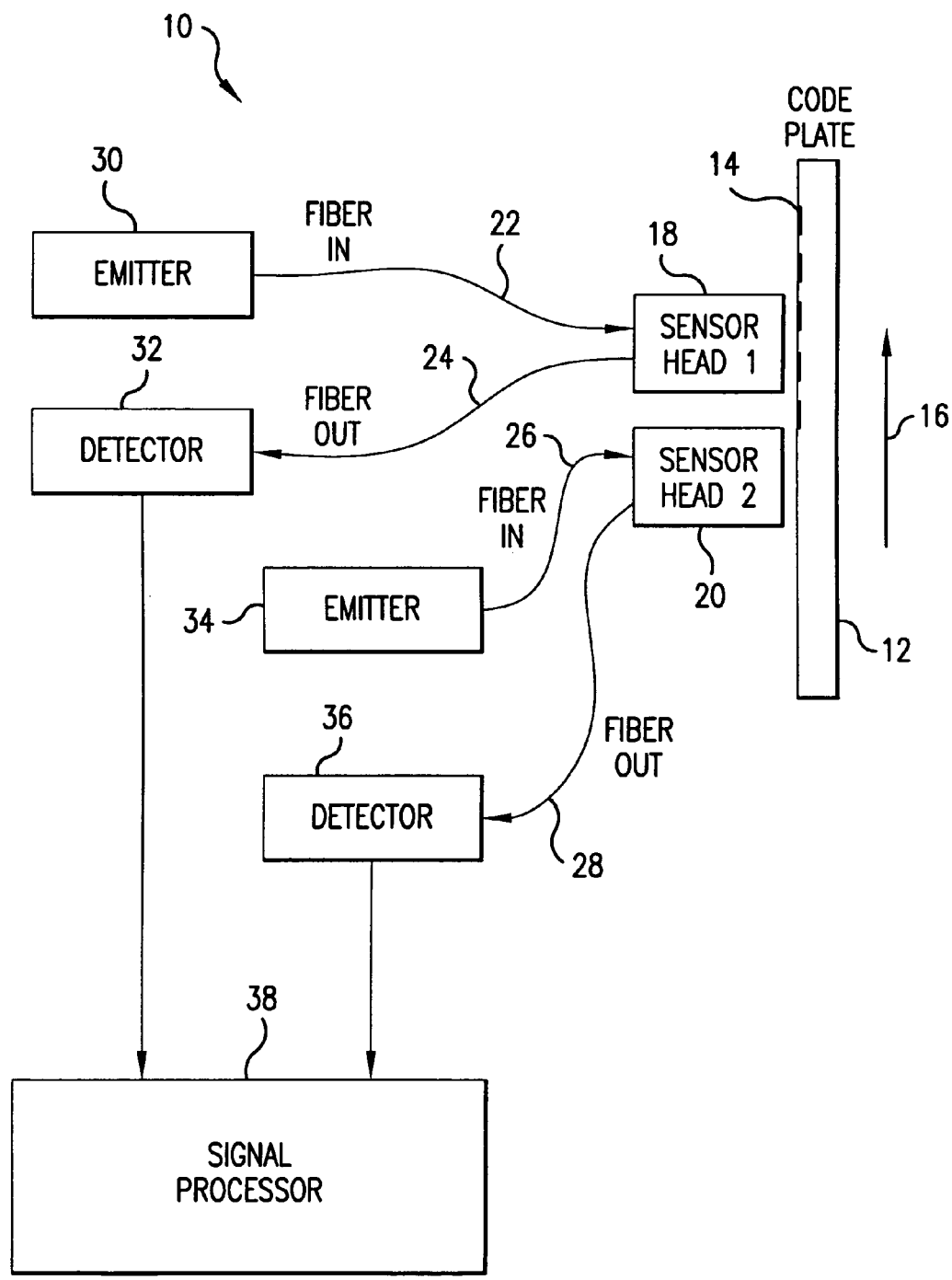
FIG. 1 is a block diagram of the present invention.

A block diagram showing the basic elements of the present invention 10 is illustrated with respect to FIG. 1. An encoder code plate 12 is associated with the movement of an element, such as either a linear actuator or a rotary actuator (not shown). The code plate 12 is either directly applied to the surface of an actuator or is attached to an actuator in a manner such that movement of the actuator is correlated with movement of the code plate 12, thereby providing an exact determination of the position of the actuator. The code plate 12 is generally transparent and would be provided on its surface with a plurality of digital words, each digital word consisting of a plurality of digital bits. Each of the digital bits would contain a plurality of parallel reflecting like-shaped encoder elements each having the same bit pitch. Therefore, each of the encoder elements of each of the digital bits would vary the reflectivity of an optical signal projected onto the code plate, over the length of that particular digital bit. The encoder elements 14 are broadly shown in FIG. 1. Reference will be made to additional figures to illustrate the exact structure of the encoder elements of each of the bits which in turn would create a digital word. As depicted in the additional figure, the encoder elements 14 take the form of wedge-shaped elements.

The wedge-shaped elements produce an approximately linear variation of detected signal amplitude across the span of a single digital bit. It will be obvious to those skilled in the art that other means, such as micro scale variation of coating density or approximately linear changes in the reflection spectrum may alternatively be used to produce a discernable variation in the detected signal across a bit.

Although the present invention could operate utilizing a multitude of sensor heads, as has been described hereinabove, the present invention would generally utilize one or two sensor heads. The use of only one sensor head would result in a savings of money in producing the optical reader according to the present invention but would sacrifice the ability to maintain a continuous linear reading. In addition, the use of only a single sensor head would reduce the complexity of a processor utilized with the present invention and would also increase the speed of the processing of the present invention. However, as indicated hereinabove, this is done by sacrificing the ability to maintain a continuous linear reading. Therefore, for ease of discussion of the present invention, we will limit our description to an encoder utilizing two sensor heads.

As shown in FIG. 1, a first sensor head 18 will be provided at a relatively close distance above the code plate 12. A second sensor head 20 would also be provided at a relatively close distance from the code plate 12. The sensor head distance is minimized by making the reflective surface of the code plate 12 face the sensor head. The sensor head is placed as close as possible to the code plate 12 consistent with avoiding physical contact that might cause wear on the code plate reflectivity material in the presence of shock and vibration. An input fiber optical waveguide 22 would be connected between the sensor head 18 and an emitter 30 for emitting the proper optical radiation, such as a laser beam. An output fiber optical waveguide 24 would be connected between the sensor head 18 and a detector 32 for sensing the reflected optical power of the laser output reflected off of the wedge-shaped digital bits. As previously discussed, the reflectivity of each digital bit would change over the length of that digital bit, thereby allowing the present invention to determine the exact position of the sensor head with respect to the code plate 12.

The second sensor head 20 is provided at a close distance from the sensor head 18 and, similar to the sensor head 18, would be provided with an input fiber optic waveguide 26 connected between the sensor head 20 and an emitter 34 providing an optical output to the sensor head 20, such as a laser output. An optical fiber optical waveguide 28 is provided between the sensor head 20 and a detector 36. Both detectors 32 and 36 are connected to a signal processor 38 for determining the exact position of the code plate 12 based upon the outputs transmitted by the detectors 32 and 36 to the signal processor 38. Similar to the optical output signal generated by the first sensor 18, the output of the second sensor 20 is also indicative of the reflected optical power of the optical signal reflected off of one of the encoder elements 14. Generally, both of the sensor heads 18,20 remain stationary while the code plate 12 moves above or under the sensor heads. However, for convenience in describing the encoder operation, we adopt the convention of having the sensor head in motion relative to a fixed code plate.

The two waveguide sensing heads 18, 20 are separated in the measurement direction as depicted by arrow 16 by, for example, 0.5, 1.5, 2.5 or 3.5 times the bit pitch of the individual encoder elements 14. This separation assures that handing the signal readout back and forth from one fiber pair to another fiber pair will maintain a linearly-varying signal versus position of relationship over the entire encoder range. Maintaining a constantly linear signal in turn would allow the encoder to provide the absolute position at all times without correlation with other sensor data. The loss of signal as a function of sensing head distance from the code plate reflecting surface is proportional to the distance between the code plate 12 and each of each of the sensor heads 18, 20. The sensing head distance is minimized by making the reflective surface of the code plate 12 face the sensing head. Therefore, although the present invention could operate with the input waveguide provided on the opposite side of the code plate 12 with respect to the output waveguide, the present invention will be described with respect to a sensing head having an input waveguide and an output waveguide on the same side of the code plate.

Figure 2:
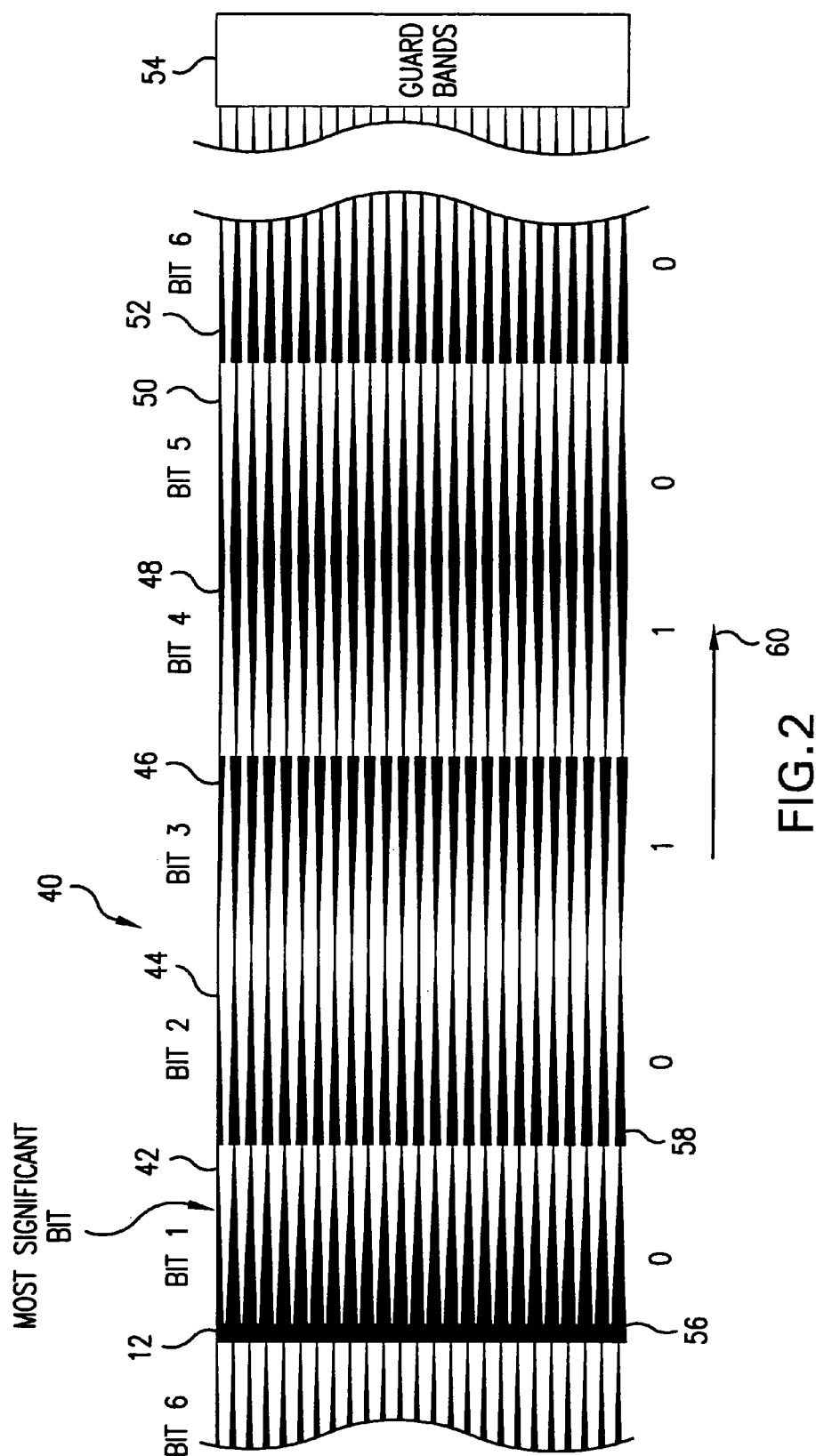
FIG. 2 is a diagram showing a typical digital word.

A typical digital word 40 is illustrated with respect to FIG. 2. This digital word 40 consists of a plurality of digital bits 42, 44, 46, 48, 50 and 52. Although the exact number of digital bits comprising each digital word is not crucial for the teaching of the present invention, for purposes of illustration, we will utilize a digital word containing six bits. Since each digital bit represents either a digital "0" or a digital "1", the number of distinct digital words that can be provided on a code plate would be $2^6$ which equals 64 digital words. Therefore, a code plate consisting of digital words, each digital word comprised of six digital bits, would allow a total of 64 different digital words to be provided on the code plate.

Each digital bit contains a plurality of equally-shaped reflecting wedges whose thickness varies in a linear manner from one side of the digital bit until the second side of the digital bit. For example, the leftmost side 56 of bit 42 is relatively thick and the thickness of each of the wedges of bit 42 would decrease in size linearly until it reaches edge 58. The distance between edges 56 and edges 58 is the same for all bits and is called the bit pitch. The reflectivity of bit 42 is highest at the thickest part 56 of the bit 42 and is lowest at the thinnest part 58 of the bit 42. Therefore, the encoder reflectivity would vary as the code plate moves above or below the stationary sensor heads 18, 20. A rising slope would be equated as a digital 1 in which the thickness of the wedge increases in the measurement direction 60, as, for example, bit 46. A falling slope such as shown in bit 42 would denote a digital 0. Consequently, since the signal processor 38 is aware of the exact position of each of the digital words provided on the code plate 12, once it is established where the sensing heads are positioned within a single digital word or, in the instance of two sensing heads, in one digital word or an adjacent digital word, the absolute position of the code plate can be determined to a resolution of one bit pitch. This bit pitch resolution determination is then refined in an analog manner by determining the exact position of the sensor head or heads within a particular bit of a particular digital word by the determination of the reflectivity of the wedge-shaped element of that particular digital bit, since the variation of reflectivity across the bit pitch of each of the wedges is known. Therefore, once it is determined over which digital word the stationary sensor head is positioned, it can then be determined, utilizing the exact reflectivity level, the exact position within that digital bit of the particular digital word. The digital words can be placed on the code plate 12 to utilize a binary Gray code wherein each digital word differs from its adjacent digital word by only a single bit. Since the present invention employs a six-bit digital word, a six-bit binary Gray code would be employed. The single bit change from word to word in a gray code provides an indication of error-free operation.

Furthermore, a plurality of guard bands 54 is provided at both ends of a linear code plate. It is possible that a rotary code plate would employ only a single grouping of guard bands. Assuming that the digital word 40 shown in FIG. 2 is the last word at the high end of the code plate, guard bands 54 would include a series of high-reflection "1" bits. This is contrasted to the series of guard bands which would be provided at the low end of the code plate, these guard bands providing a series of low reflection "0" bits. The use of these guard bands 54, along with the fact that the signal processor 38 is aware of the exact position of each of the digital words, would prevent the code plate 12 and its associated actuator from moving beyond a particular point in the measurement direction. The guard band 54 provides the preferred travel direction indication within one bit pitch distance of the motion of the code plate 12.

Figure 3:
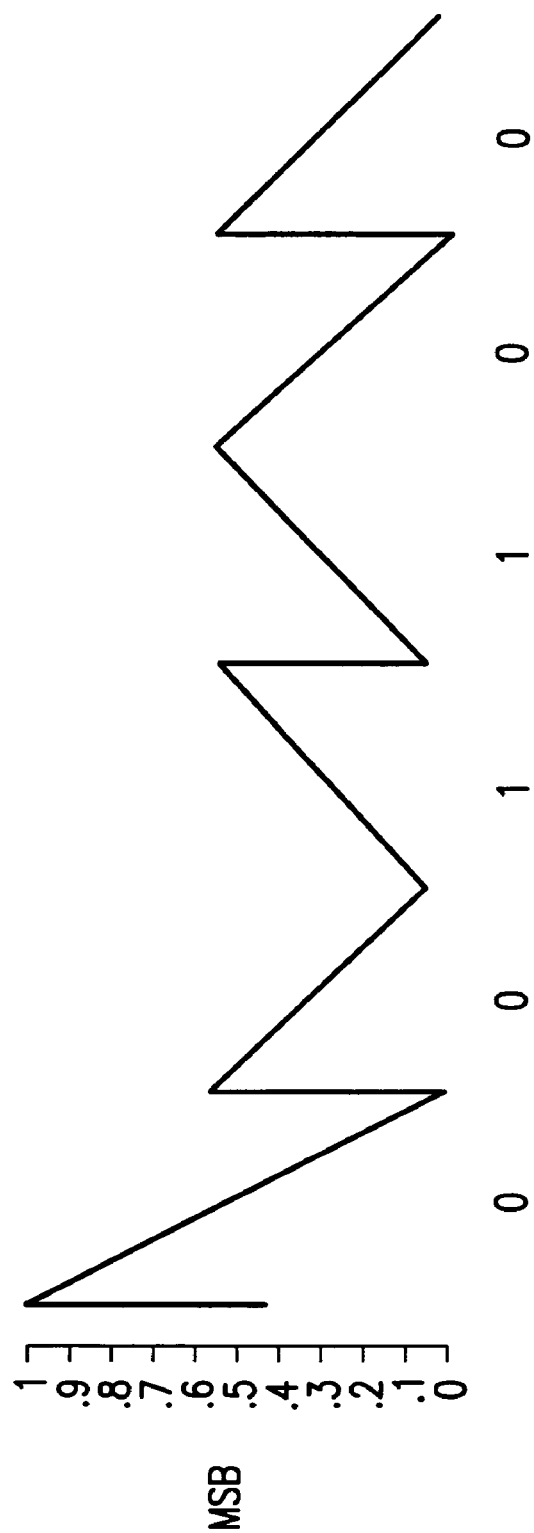
FIG. 3 is a readout of the digital word in FIG. 2.

As shown in FIG. 2, digital word 40 has the digital notation of 001100. Since it is important to determine the exact digital word sensed by the sensor heads 18, 20, the leftmost bit of each of the digital words is designated as the most significant bit (MSB) of each word and this bit can be differentiated from the other five bits of a six-bit digital word. In the case of FIG. 2, the most significant bit is denoted as bit 42. Therefore, as one of the sensor heads 18, 20 moves over digital word 40, the sawtooth waveform as illustrated in FIG. 3 would be produced. It is important to note that the dynamic range of the most significant bit 42 is twice that of the dynamic range of all of the other bits of digital word 40. Bit 1 of every digital word included on the code track 12 is a most significant bit differentiated from other bits by the double size dynamic range. It is the use of this greater dynamic range that would allow the present invention to determine the position of the most significant bit of each of the digital words.

Figure 4:
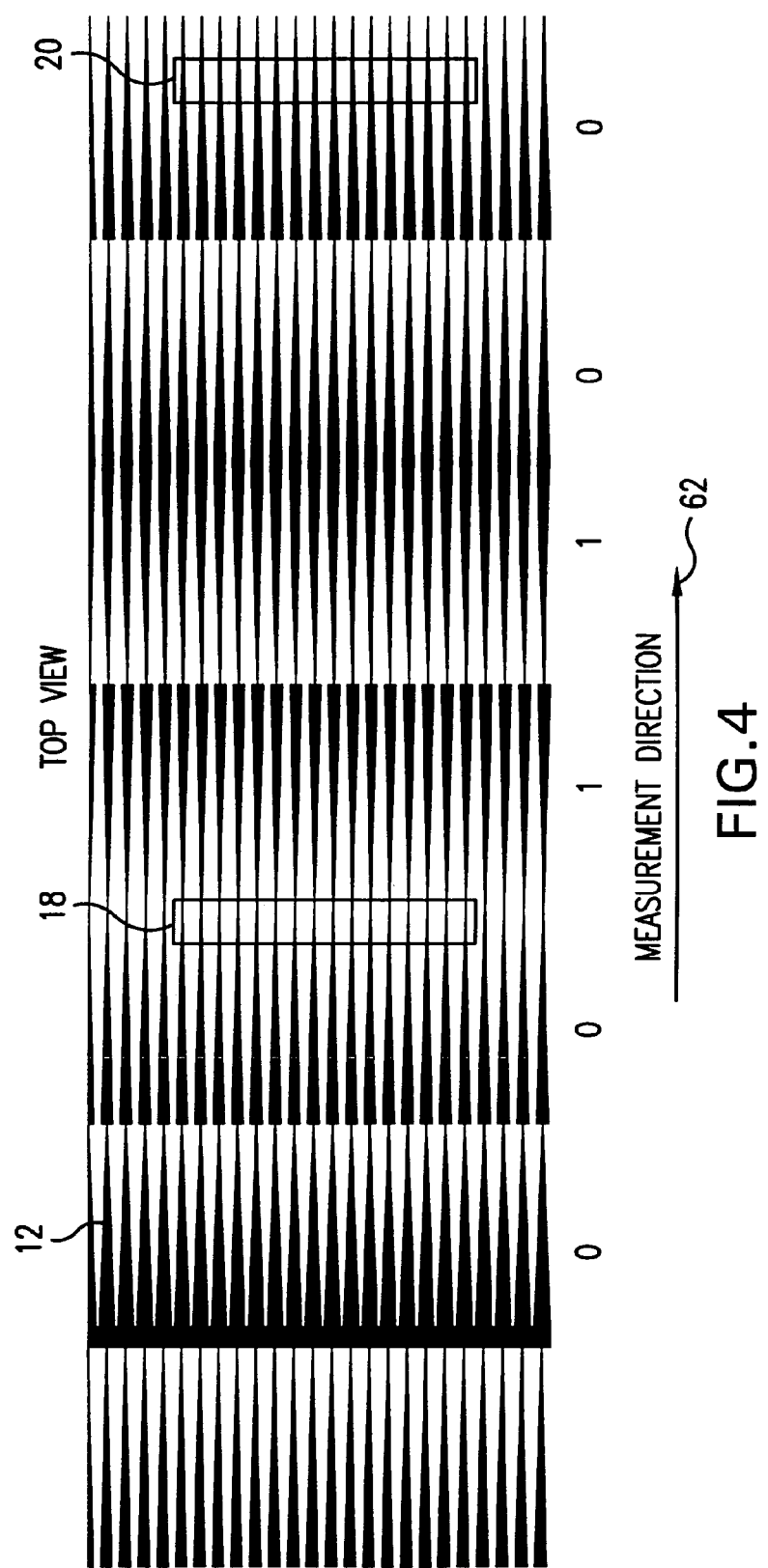
FIG. 4 is a diagram of the digital word of FIG. 2 including a top view of two optical sensor heads.
Figure 5:
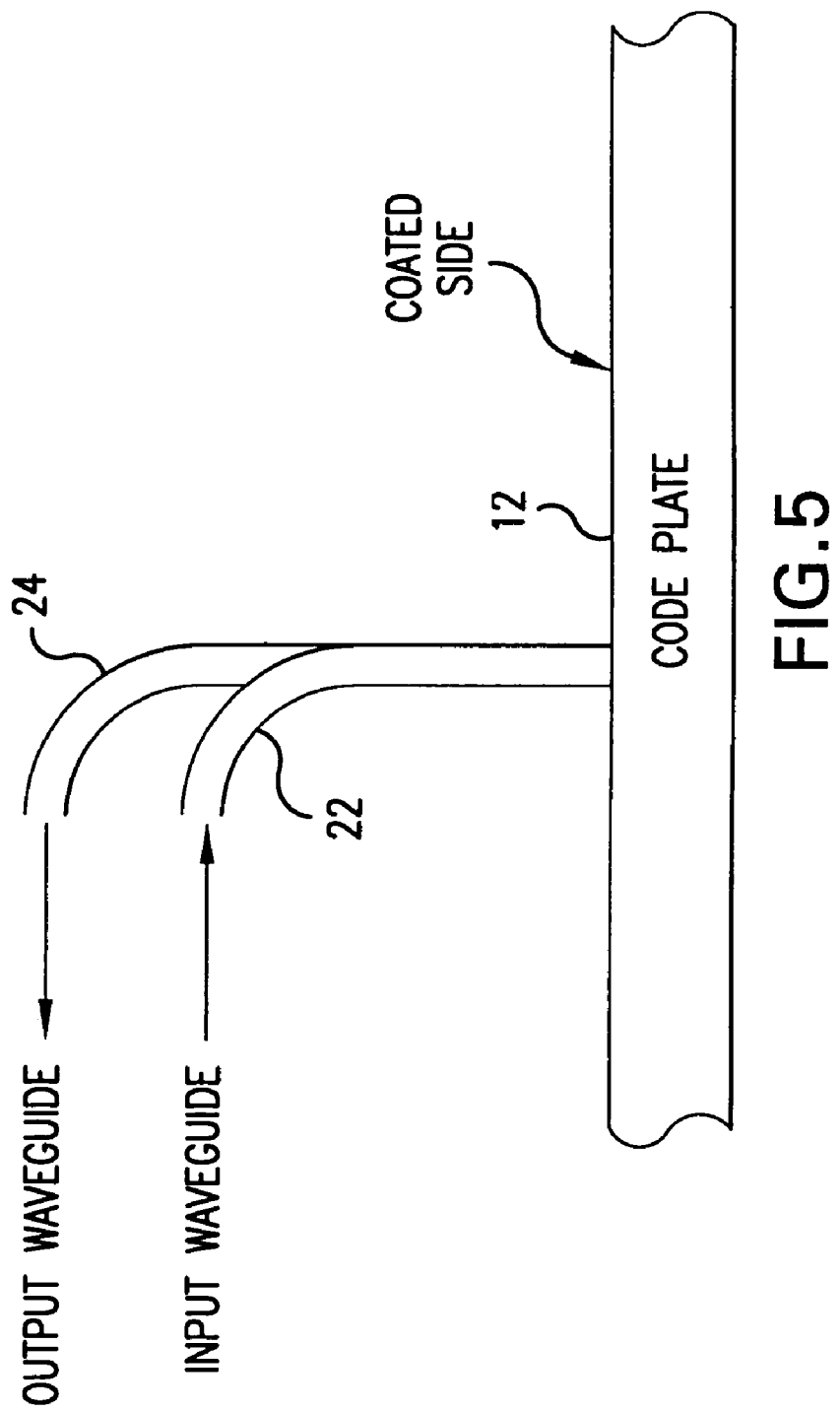
FIG. 5 is a side view of the present invention in which the sight line is orthogonal to the measurement direction.
Figure 9:
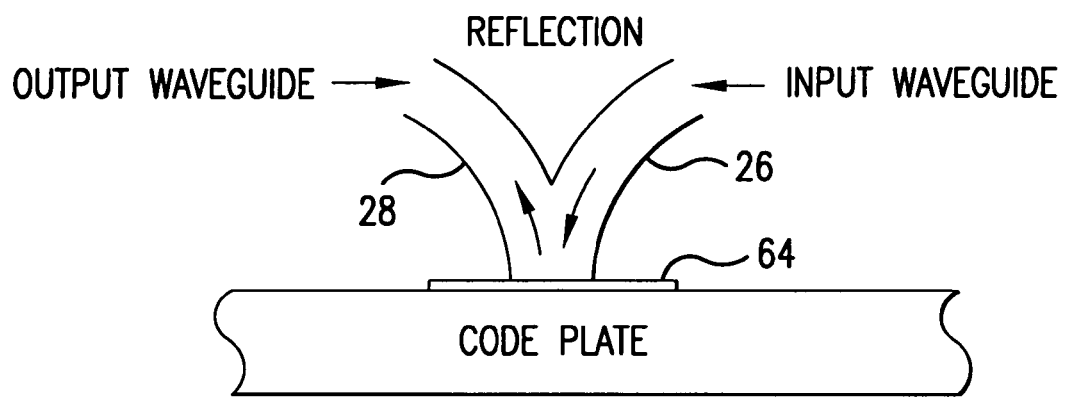
FIG. 9 is a side view of the present invention in which the sight line is parallel to the measurement direction.

FIGS. 4, 5 and 9 show a top view and two side views of the present invention, respectively. Although the code plate may move while keeping the sensor heads 18, 20 stationary, we adopt, as previously noted, a convenient understanding that even in such a case, the sensor head and code plate experience relative motion and describe this as the sensor heads moving. Likewise, the sensor head may move in either of two opposite directions. As the sensor heads 18, 20 move in the measurement direction 16, chosen arbitrarily, the read heads pass over various digital bits of various digital words of the code plate 20. Measurement direction 16 corresponds to increasing in a Cartesian coordinate system. As previously indicated, the sensing head distance between each of the heads and the code plate 12 is placed as close as possible consistent with avoiding physical contact that might cause wear on the code plate reflecting material in the presence of shock and vibration. Typical distances between the sensor heads and the code plate would be between 20 and 100 microns. It is noted in FIG. 4 that length of each of the sensor heads 18, 20 is less than the width of the code plate 12 to allow for jitter.

Minimal optical power loss is achieved by use of a planar waveguide coupler having two branches 26, 28 converging on an exit face 64. Emitted light passes through one branch, out of the coupler and is reflected off of the code plate and passes back into the other coupler branch. The planar waveguide coupler would have an in-plane dimension, seen in FIG. 9, substantially greater than the out-of-plane dimension, seen in FIG. 5. The out-of-plane dimension would be aligned in the measurement direction of the optical encoders. This would create a situation where very little light is lost due to beams spreading in the in-plane direction. The multi-mode fiber utilized as the waveguides would accept multi-mode fiber input and output with minimal insertion loss. While high resolution is one of the objects of the present invention, an extreme high resolution is achievable utilizing only a single mode optical fiber. However, the resolution utilizing a multi-mode fiber is sufficiently high to provide the results required by the present invention.

The particular signal processor 38 used in the present invention would be chosen based upon the type of response time contemplated. Short read-out response time depends on the signal processor speed and the particular processor algorithm employed. In order to accommodate a rapid response time, the algorithm can output an immediate position value based solely on signal amplitude variation handed off from the two sensing heads, followed by confirmation of the absolute position based on the next decoded digital word. This method allows the shortest instantaneous response to motion combined with reasonably rapid confirmation of the absolute position.

High resolution of the present invention is obtained by using all of the possible digital words based upon the number of digital bits in each digital word. For example, in the embodiment illustrated in FIGS. 2 and 4, in which each digital word contains six bits, a possible 64 different digital words can then be created. Since each digital word contains six bits, this results in a total 384 bits. If the position within a given bit can be resolved to 1/10 of a bit based upon the signal amplitude within a linear variation range, then the position of the sensor head can be determined absolutely to one part in 3,840. A practical limit on the resolution may be 1/100 of a bit having a 30 micrometer pitch. This produces position resolution of one part in 3,300,000 over a one meter code plate. Obviously, the length of the code plate can be extended arbitrarily by increasing the number of bits in the encoder word.

Figure 6:
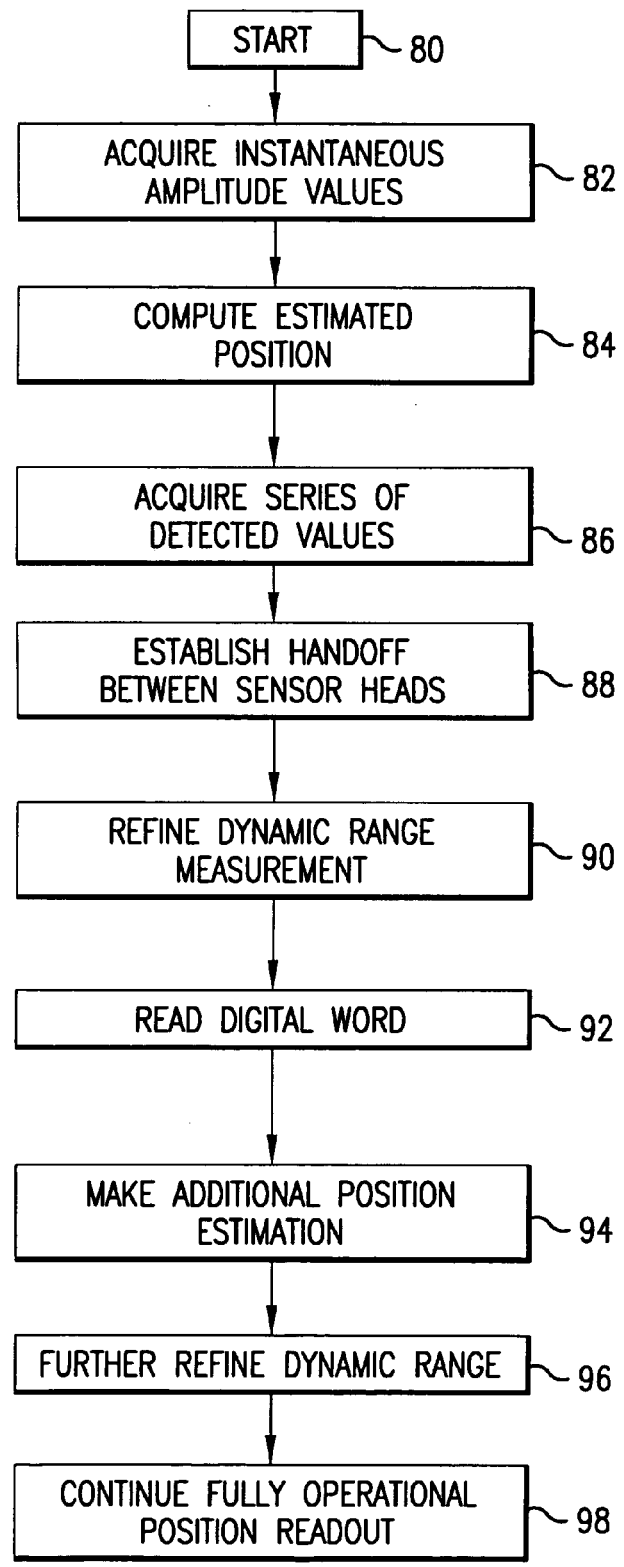
FIG. 6 is a block diagram of a method of determining position according to the present invention.

Your attention is now directed to FIG. 6 which illustrates a simplified flow diagram explaining the manner in which the present invention determines the initial position of the code plate based upon the position of one of the sensor heads. It should be noted that the following algorithm as illustrated with respect to FIG. 6 is but one of a number of algorithms which could be used to determine the exact position of the code plate.

When the system is turned on, either initially or after a loss of power, the positioning algorithm will be initiated at step 80. At this point, both of the sensor heads 18, 20 would obtain an amplitude value of the particular spot of the bit of a particular digital word over (or under) the sensor is positioned at step 82. The value of the instantaneous amplitudes would form a first estimate of the position of the designated sensor head 18 or 20. These instantaneous amplitude values are designated as d[1,1] and d[2,1]. At this point, step 84, an estimated position of the sensor head and, of course, the code plate would be determined utilizing the following equation:

$$X_0 = (2L/D)[(d[1,1]+d[[2,1])/2 - D/4 - D_0] \quad\quad 1$$

where
L=Full measurement range
$D_0$=Lowest signal level
$D_{max}$=Highest signal level
$D=D_{max}-D_0$=Full system dynamic range The ability to make this estimation depends on code plate less significant bits using less than the full dynamic range and shifting from an average of D/4 to an average of 3D/4 across the full code plate length.

A series of detected values is then acquired at step 86. These detected values represent a dynamic range used by all of the bits with exception of the most significant bit. A second estimation of position is then made. These detected values are acquired after several cycles of rising and falling signal levels as sensed by both of the detectors. During the initial determination of the position of the code plate, the code plate might be forced to move at least in one direction allowing the sensor heads to acquire these additional values. The maxima and minima of these values d[1,j] and d[2,j] are observed, out of phase. All of the signal values detected would be recorded using sequence indicator j for later processing reference. The values 1 or 2 for d[i,j] define which of the sensor heads is providing a given detected signal; i=1 for sensor head 18 and i=2 for sensor head 20. A sample rate is established using the number of samples per cycle as a measure and, for example, ten samples per cycle as a criterion. The average of cycle peaks (highest value in a given cycle, $D_{MAX}$) and average of cycle valleys (lowest value in a given cycle, $D_{MIN}$) are then measured. The most significant bit (MSB) is identified using:

$$d_{MAX}[i,j] - d_{MIN}[i,j] > 1.5*((\text{average of } d_{MAX}) - (\text{average of } d_{MIN})) \quad\quad 2$$

Excluding the MSB, the average of cycle peaks and the average of cycle valleys are noted. The dynamic range $d_1$ of all of the bits other than the MSB is as follows:

$$d_1 = (\text{average of } d_{MAX}) - (\text{average of } d_{MIN}) \quad\quad 3$$

The detected signal mid value $d_m$ is determined utilizing:

$$d_m = ((\text{average of } d_{MAX}) + (\text{average of } d_{MIN}))/2 \quad\quad 4$$

Based upon these computations, an estimated position $X_1$ is computed with step 86:

$$X_1 = (L/d_1)[d_m - D_0 - d_1/2] \quad\quad 5$$

Equation 5 captures the early position estimation benefit associated with a gradual rise in the $d_m$ value across the code plate.

Once this second estimated position is determined, a hand-off back and forth is established between detected signals d[1,j] and d[2,j] from sensor heads 18 and 20 at step 88. As an initial sub-step within step 88, Table T is formed. Each time the detected signal values d[1,j], d[2,j] are acquired, j would be incremented by 1 and new detected signal values would be added. Let P be the distance along the X axis equivalent to 1 bit pitch, and assume that the sensor heads are separated by 3.5P. Table T is scanned for the first instance of d[1,j] in a range which can occur only if the detector d[1,j] is reading an MSB (d[1,j] above $d_{MAX}[i,j]+0.12d_1$ or below $d_{MIN}[i,j]-0.12d_1$).

TABLE T

| j | d[1,j] | d[2,j] |
|---|--------|--------|
| 1 | d[1,1] | d[2,1] |
| 2 | d[1,2] | d[2,2] |
| 3 | d[1,3] | d[2,3] |
| ... | ... | ... |

If d[2,j] encounters an MSB first, the roles of d[1,j] and d[2,j] can be reversed relative to this description, resulting in a small reduction in time to acquire the next stage of absolute position improvement.

$j_1$ is designated the first j for which d[1,j] can only be an MSB. Assume initially that increasing j is initially capturing data from increasing X positions. This assumption will be either validated or reversed and corrections applied later in the process. Determine sign of MSB (=MSBS) at $j_1$ as MSBS=+1 if d[1,j] vs j slope is positive and MSBS=−1 if d[1,j] vs j slope is negative.

$$D_{Mid} = (D_0 + D_{max})/2 \quad\quad 6$$

$$D = D_{max} - D_0 \quad\quad 7$$

Form fourth and fifth columns of table [T] for $\Delta X_1$ and $\Delta X_2$. For all rows before and after $j_1$ in which d[1,j] stays between $d_{MIN}+0.13*d_1$ and $d_{MAX}-0.13\,d_1$ assign a value of $\Delta X_1$.

$$\Delta X_1 = (MSBS)*P*(d[1,j]-D_{Mid})/D \qquad 8$$

For those j near $j_1$ in which the absolute value of $\Delta X_1$ is between 0.32*P and 0.43*P, determine whether d[2,j] is tracking d[1,j] with the same or opposite sign of slope relative to $\Delta X_1$ ordinate. Based on this determination, assign a value of +1 or −1 to the bit slope of a bit in which d[2,j] is positioned (BS=1 or −1). Also establish the sign of + or − direction of motion (DS=1 if motion is increasing X through d[1,j], d[2,j] transition and DS=−1 if motion through transition is decreasing X. Establish cumulative position (CP) index which is incremented by P/2 when DS=1 and reduced by P/2 when DS=−1. Enter in column 5 values for $\Delta X_2$ when d[2,j] is between $d_{MIN}[1,j]+0.13*d_1$ and $d_{MAX}=[1,j]-0.13*d_1$:

$$\Delta X_2 = CP+BS*P*(d[2,j]-d_M)/d_1 \qquad 9$$

The $\Delta X_2$ value from Equation 9 refers to the position of sensor head d[1,j] inferred from sensor head d[2,j] data. Sensor head d[1,j] is therefore a universal reference position element regardless of whether data defining position enters via sensor head d[1,j] or d[2,j].

Transitions from d[2,j] to d[1,j] are made in a similar manner to those from d[1,j] to d[2,j] and the formula for $\Delta X_1$ when d[1,j] is the differential position data source is:

$$\Delta X_1 = CP+BS*P*(d[1,j]-d_M)/d_1 \qquad 10$$

with CP and BS determined as was done for $\Delta X_2$. In general, bit transitions will continue to occur as the code plate moves. Back and forth motion is accommodated by reversing CP accumulation trend when a bit transition is preceded by a direction reversal and maintaining the CP trend when bit transitions occur without direction reversal.

The dynamic range measurement is refined at step 90. As $\Delta X$ changes, determine values of $d_{MAXO}[i,j]$, $d_{mino}[i,j]$ and D for which the following expressions are minimized:

$$\sum \left( \frac{\Delta xD}{2L} + d_{MINO} - d[i,j] \right)^2 \qquad 11$$

$$\sum \left( \frac{\Delta xD}{2L} + d_{MAXO} - d[i,j] \right)^2 \qquad 12$$

where $d_{MINO}$ is the minimum d[i,j] associated with low-to-high or high-to-low LSB transition, $d_{MAXO}$ is the maximum d[i,j] associated with a low-to-high or high-to-low LSB transition in the sampled data and only $\Delta X$ and d[i,j] values associated with minima or maxima of the d[i,j] series are considered.

Continuously gather data and improve $d_{min}[i,j]$ and $d_{max}[i,j]$ and D estimation accuracy. Formulas 1 through 12 require small corrections such as:

$$d_1 = fl*(d_{MAX}[i,j]-d_{min}[i,j]) \qquad 13$$

These correction factors, along with estimated numerical values for signal thresholds given above, will be determined during system calibration.

Based upon this information, the first digital word is read at step 92.

As the code plate moves, the absolute value of $\Delta X$ will reach 2.5*P, then 3.5*P. If d[2,j] reaches the center of an MSB at $\Delta X=3.5*P$, the direction of net motion is increasing X. d[2,j] at X tracking exactly d[1,j] previously obtained when sensor head 1 was positioned at X will verify this determination. If d[2,j] reaches an MSB center at $\Delta X=2.5*P$, direction of motion is decreasing X and that determination is verified by d[1,j] at X tracking exactly d[2,j] previously obtained when sensor head 2 was positioned at X. If the direction of motion is decreasing X, assign a negative sign to X motion and reassess tabulated $\Delta X$ values.

For increasing X, assign bit value=1 for rising slope and bit value=0 for falling slope. If the encoder passes new bits while moving in the −X direction, the bit value assignment criteria must reverse signal slope referenced to j sequence numbers in order to maintain a consistent bit value assignment referenced to the X axis.

Associate bit values with integer multiples of bit pitch in the direction of increasing X. For example, MSB is bit 0, bit with X=P at center is bit 1, bit with X=2P at center is bit 2, and so on up to bit 5. Use d[1,j] as reference for bit number determination.

When bits 0 through 5 associated with any MSB have been assigned values, decode digital word, using the Gray code as a reference.

A third position estimate is made at step 94.

Assign X value to center of MSB for decoded word:

X=(Decoded number)*P*6

Continue to gather bit identification as X value changes, following methods outlined above. Assign X values to MSB center of each new word decoded.

When the first word is decoded, the position of the decoded word in a system memory database is determined.

The dynamic range is further defined as step 96 and the differences between the model predictions and d(i,j) measurements are assessed. D, $D_0$, $D_{MAX}$, $d_{MAX}$ and $d_{MIN}$ values are corrected by an amount corresponding to the systematic drift that is measured. All system parameters are constantly updated to adapt to drift in the optical input signal strength or system throughput variability. If dramatic corrections occur, a possible malfunction is noted.

Figure 8:
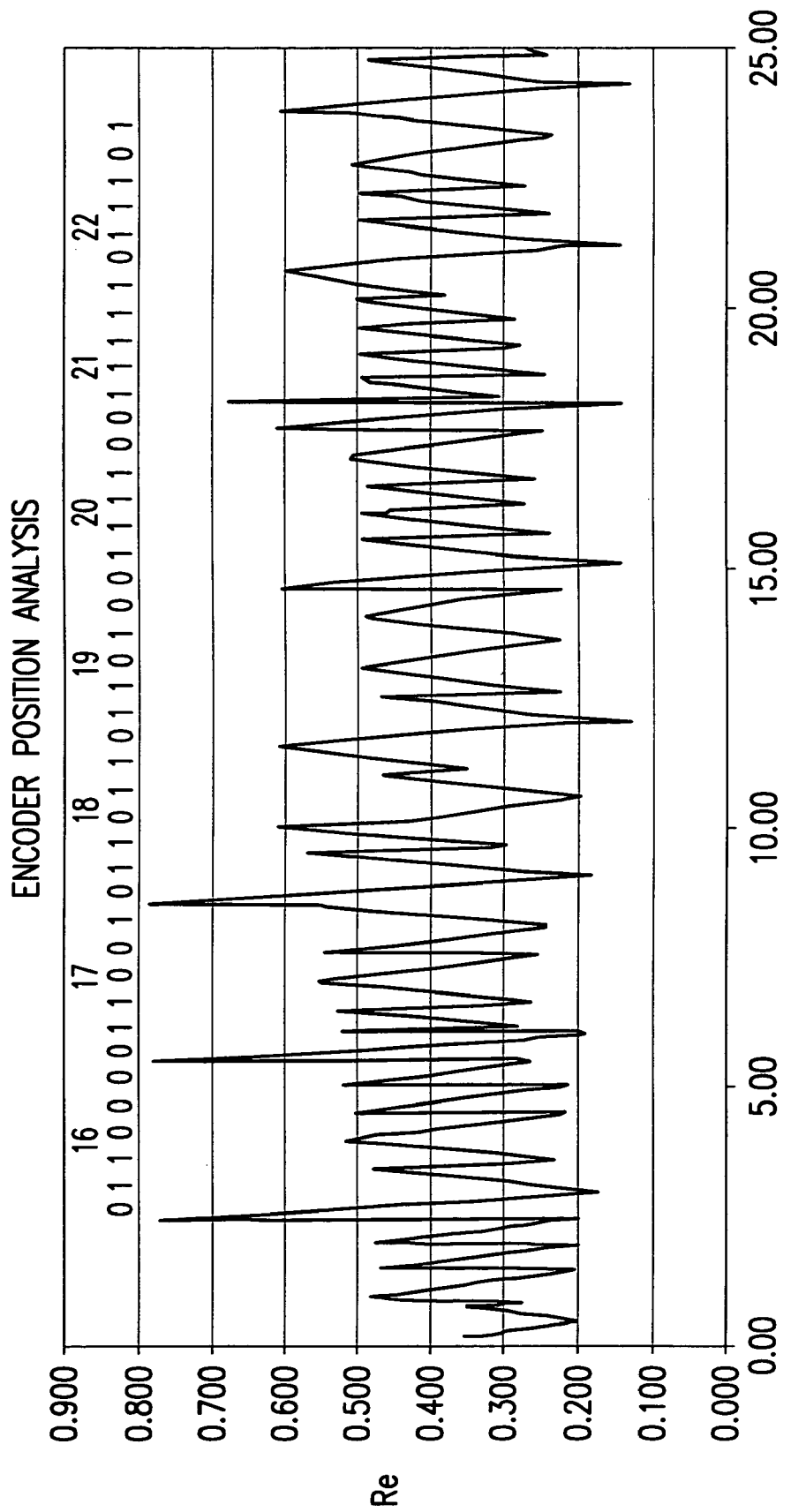
FIG. 8 is a trace of encoded detected signals according to the present invention.

FIG. 8 illustrates a trace of the detected optical signals d[1,j] where the sensor heads are moving at a constant speed in a single direction. This trace could be decoded to output X values employing the previously described algorithm.

Figure 7:
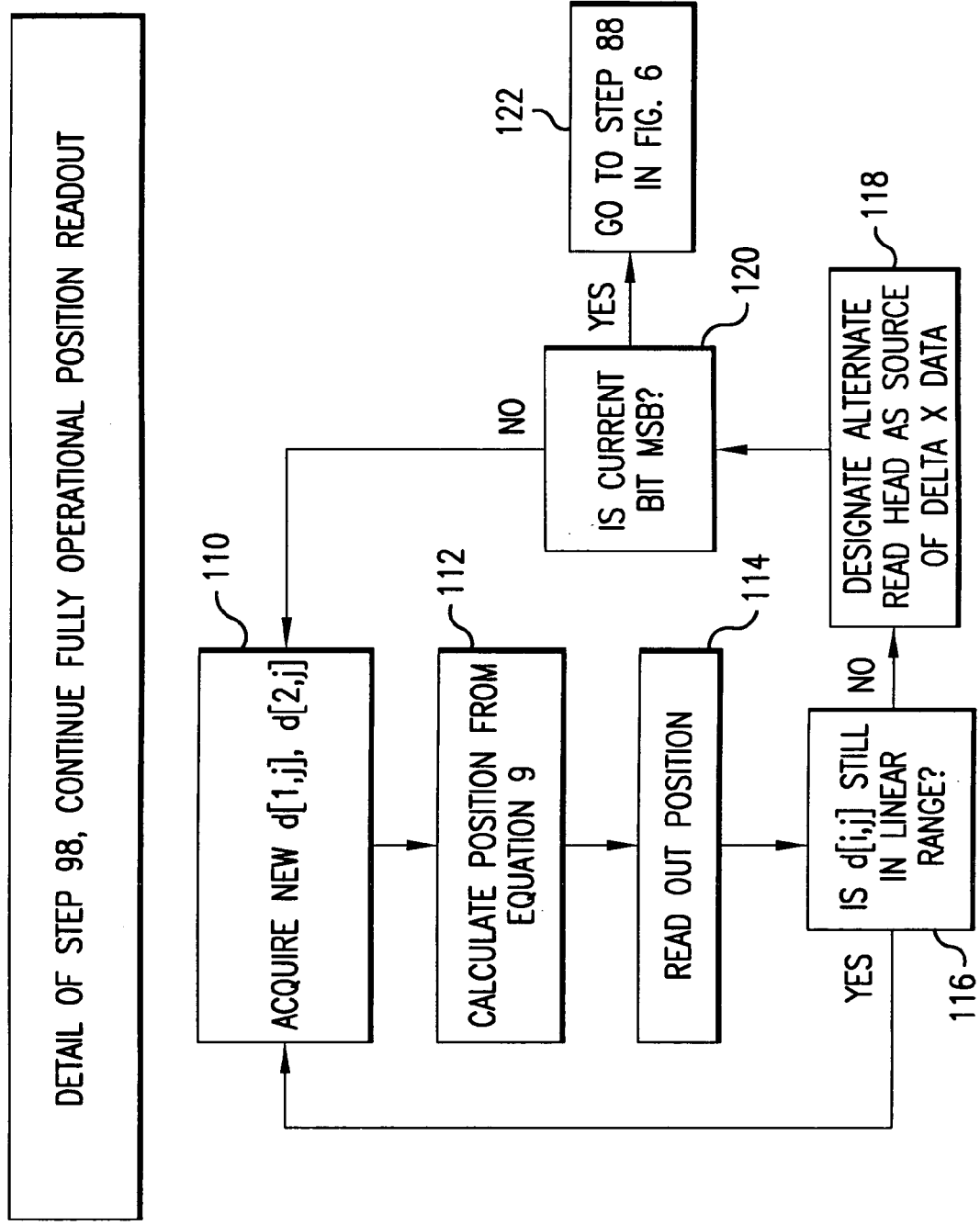
FIG. 7 is a block diagram providing a method of determining position when fully operational position readout is established.

Once the exact position of the code plate with respect to one of the designated sensors is determined, movement of the code plate from this first detected position to all subsequent positions are easily made based upon movement between a first digital bit and one or the other of the two digital bits adjacent to this first digital bit. The exact position of the code plate is then determined based upon the reflectivity value sensed by the sensor heads which, in turn, is a function of the exact position of the sensor head with respect to a bit within the digital word. Utilizing the binary Gray code would act as a further check on the position of the code plate since each of the adjacent digital words should differ from one another by only a single bit. A block diagram illustrating continuing operation of the encoder after a first digital word has been obtained is shown in FIG. 7. The block diagram of FIG. 7 provides a higher level of detail with respect to step 98 of FIG. 6.

As shown in FIG. 7, once the initial position of the code plate is determined, when the code plate moves, a new d[1,j], d[2,j] would be determined at step 110. A new position of the code plate is then determined from Equation 9 or 10 at step 112, at which point the position of the code plate is again read out at step 114. If d[i,j] is still in a linear range, the algorithm would proceed again to step 110. If it is not in the linear range, at step 116, the alternate sensor head would be designated as the source of $\Delta X$ at step 118. A determination is then made whether this new digital bit is the MSB at step 120. If it is not, the algorithm would then repeat at step 110.

If this new bit is a MSB, you would return to step 96 in FIG. 6, in which the dynamic range is refined.

The above described embodiments are merely illustrative of the principals of the present invention. Other embodiments of the present invention will be apparent to those skilled in the art without departing from the spirit and scope of the present invention.

What is claimed is:

1. An optical encoder used to determine the position of a moving element, comprising:
    a code plate moving in concert with the moving element, the code plate provided with a plurality of encoder elements spanning at least a portion of said code plate, said encoder elements comprising a plurality of wedge-shaped elements, subdivided into a series of wedge-shaped elements, each series of wedge-shaped elements representing a digital word, wherein said code plate includes a plurality of representations of digital words, further wherein each of said digital words is subdivided into a plurality of digital bits, each of said digital bits comprising a number of parallel wedge-shaped elements spanning a portion of the width of said code plate constituting a single digital bit, the thickness of each of said wedge-shaped elements linearly changing over the length of each said digital bit;
    a stationary sensor head means facing the surface of said code plate;
    an optical emitter connected to said sensor head means for producing an optical beam directed at said plurality of encoder elements;
    an optical detector connected to said sensor head means for receiving an optical beam modulated by said encoder elements; and
    a signal processor for determining the position of said code plate with respect to said sensor head means based upon the optical beam modulated by said encoder elements;
    whereby the position of said code plate is related to the position of the moving element.

2. The optical encoder in accordance with claim 1, wherein each of said digital words is unique when compared to the remainder of said digital words provided on said code plate.

3. The optical encoder in accordance with claim 1, wherein the thickness of, and therefore the dynamic range, of each of said wedge-shaped elements constituting a single digital bit would be equal to the thickness of the other wedge-shaped elements of the same digital bit at the same lateral point on said code plate, whereby the reflectivity of the optical beam reflected from said wedge-shaped elements would be indicative of the position of said code plate with respect to said sensor head means.

4. The optical encoder in accordance with claim 3, wherein each of said digital words includes a most significant bit, the dynamic range of which differs from the remaining digital bits of each of said digital words.

5. The optical encoder in accordance with claim 1, wherein said sensor head means comprises a single sensor head provided with a single fiber optical waveguide located at said sensor head for directing an optical beam from said optical emitter and receiving an optical beam reflected from said wedge-shaped elements of said code plate, said sensor head provided at a distance remote from said optical emitter and said optical detector.

6. The optical encoder in accordance with claim 1, wherein said sensor head means comprises a first sensor head and a second sensor head separated in the measurement direction by 0.5, 1.5, 2.5 or 3.5 times the bit spacing of said wedge-shaped elements.

7. The optical encoder in accordance with claim 6, wherein each of said first and second sensor heads is provided with two fiber optical waveguide located at each of said sensor heads for directing an optical beam from said optical emitter and receiving an optical beam reflected from said wedge-shaped elements of said code plate, said first and second sensor heads provided at a distance remote from said optical emitter and said optical detector.

8. The optical encoder in accordance with claim 6, wherein said signal processor is provided with a means for correlating the variation of the position of said first sensor head and said second sensor head to protect against reading errors.

9. The optical encoder in accordance with claim 1, wherein each of said digital words includes six digital bits.

10. The optical encoder in accordance with claim 1, wherein said digital words are arranged in said code plate in a Gray code configuration to protect against bit reading errors.

11. The optical encoder in accordance with claim 1, wherein at least one guard band is provided on either side of said digital words.

12. The optical encoder in accordance with claim 1, wherein the average thickness of each of said wedge-shaped elements of each of said digital bits increases over the entire code plate length.

13. The optical encoder in accordance with claim 12, wherein a decreasing thickness of each of said wedge-shaped elements represents a digital "0" and the increasing thickness of each of said wedge-shaped elements represents a digital "1".

14. The optical encoder in accordance with claim 1, wherein the bit pitch of each of said digital bits is equal to one another.

15. The optical encoder in accordance with claim 1, wherein the bit pitch of said digital bits is variable.

16. The optical encoder in accordance with claim 1, wherein said code plate moves in a linear direction.

17. The optical encoder in accordance with claim 1, wherein said code plate moves in an angular direction.

18. The optical encoder in accordance with claim 1, wherein said optical emitter and said optical detector are on the same side of said code plate and said optical beam received by said optical detector is reflected from said encoder element.

19. The optical encoder in accordance with claim 1, wherein said optical emitter and said optical detector are on opposite sides of said code plate, and said optical beam received by said optical detector is transmitted through said encoder element.

20. The optical encoder in accordance with claim 1, wherein said signal processor continuously decodes said digital words as said code plate moves, the latest decoded word replacing the penultimate decoded word.

21. The optical encoder in accordance with claim 1, wherein said stationary sensor head comprises a planar waveguide coupler having an in-plane dimension greater than the out-of-plane dimension.

22. The optical encoder in accordance with claim 21, wherein said out-of-plane dimension is aligned in the measurement direction of the optical encoder.

* * * * *